June 26, 1962     G. A. SISK     3,041,439
ELECTRIC WIRE STRIPPER
Filed June 2, 1959
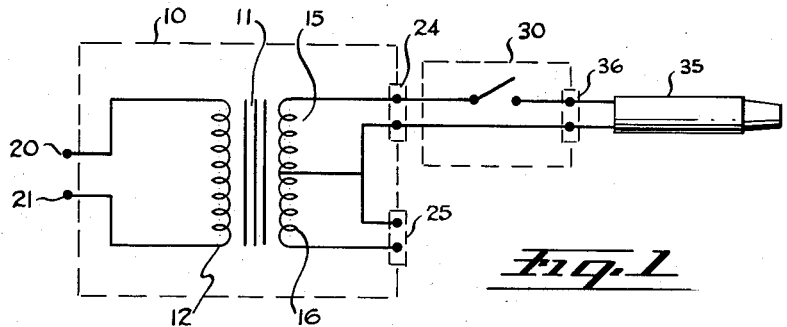
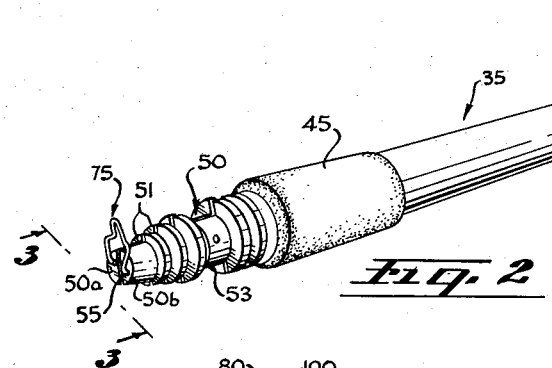
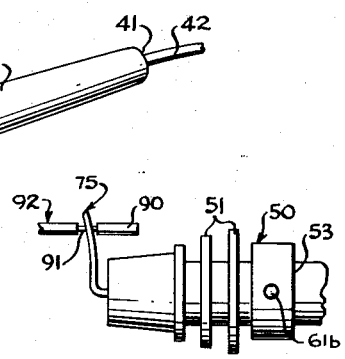
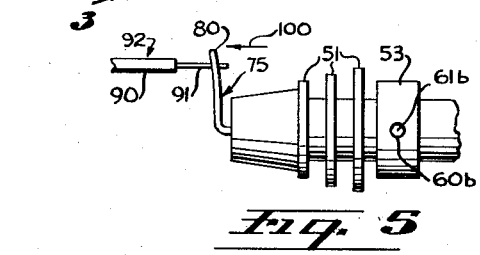
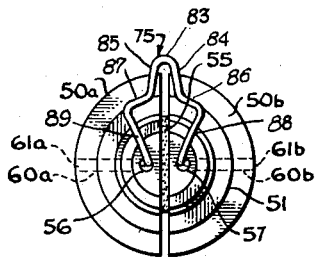
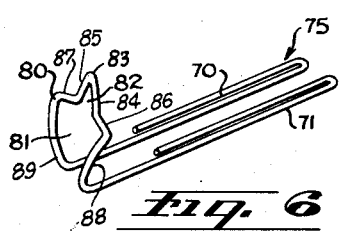
GLENN A. SISK
INVENTOR.
BY *Spensley and Horn*
ATTORNEYS

# United States Patent Office 3,041,439
Patented June 26, 1962

3,041,439
ELECTRIC WIRE STRIPPER
Glenn Arden Sisk, Hawthorne, Calif., assignor to American Missile Products Co., Inc., Lawndale, Calif., a corporation of California
Filed June 2, 1959, Ser. No. 817,593
5 Claims. (Cl. 219—29)

This invention relates to a wire stripping device and more particularly to a device for stripping the insulation from a wire.

It is often important in the manufacture of modern complex electronic systems to strip the insulation from the ends of a wire conductor in such a manner as to avoid any damage to the wire. This is especially important where the end of the wire which is exposed is to be soldered to an electronic component which in the course of its use, will be subjected to mechanical shock. It has been found, in the past, that failures have resulted in the overall system upon a break in the electrical conduction between a component such as a relay, and the exposed end of a wire which has had the insulation removed therefrom by prior art mechanical strippers. This failure is believed to be due to the following mechanisms. Where the insulation is stripped or removed by a conventional prior art mechanical device, a niche is usually impressed in the wire below the edge of the insulation. Where the exposed end of the wire is soldered to the component there is a tendency for the solder to flow under the insulation to the length of as much as an inch. Upon continued vibration or sudden mechanical shock, the wire, which has been rendered stiff by the solder, will typically break at the niche thus producing a failure by causing an open circuit.

The present invention device includes an improved electrically heated filament of a particular configuration which overcomes the hereinabove discussed limitations.

It is an object of the present invention to provide an improved electrical wire stripping device.

Another object of the present invention is to provide an electrical wire stripper which will quickly and efficiently cut the insulation about a wire conductor without adversely affecting the wire conductor.

Yet another object of the present invention is to provide an electric wire stripper of the character described which will efficiently, accurately and quickly remove high melting point plastic insulation from about an electric conductor.

A still further object of the present invention is to provide an electric wire stripper of the character described which includes a self-cleaning filament.

A still further object of the present invention is to provide a wire stripper apparatus which makes provision for a plurality of strippers to be operated from a single source of power.

In accordance with the presently preferred embodiment of this invention there is provided a transformer having a center-tapped secondary winding. An electric wire stripper including an insulated handle is connected through a manually operative switch to one side of the secondary winding of the transformer. A heater filament is secured within the end of the handle opposite the switch. This heater element extends longitudinally outward from the end of the handle a relatively short distance and thence radially in a closed loop which is in a plane substantially normal to the longitudinal axis of the handle. The closed loop includes a radially inner section and a radially outer section defining coextensive openings such that the outer opening is considerably smaller than the inner opening.

The novel features which are believed to be characteristic of the present invention, together with further objects and advantages thereof, will be better understood from the following description in which the invention is illustrated by way of example. It is to be expressly understood, however, that this description is for the purpose of illustration only and that the true spirit and scope of the invention is defined by the accompanying claims.

In the drawing:

FIGURE 1 is a schematic diagram of an exemplary apparatus in accordance with the present invention;

FIGURE 2 is a perspective view of the presently preferred embodiment of the wire stripper in accordance with this invention;

FIGURE 3 is a view taken along line 3—3 of FIG. 2;

FIGURE 4 is a side elevation of the forward end of the wire stripper shown in FIGURE 2 showing it in use during the intermediate stage in the removal of the insulation from a wire;

FIGURE 5 is a view similar to FIG. 4 showing the wire stripper of the insulation; and FIGURE 6 is an enlarged perspective view of the heater element of the wire stripper device shown in FIG. 2.

Referring now to the drawing and more particularly to FIG. 1 therein is shown in schematic a housing 10 which has a transformer 11 disposed therewithin. The transformer 11 includes a primary winding 12 and a center tapped secondary winding including two sections 15 and 16. The primary winding is connected to a source of A.C. electricity, not shown, through contacts 20 and 21. The secondary sections of the transformer 11 are each connected to an output receptacle, the section 15 to a receptacle 24 and the section 16 to a receptacle 25. For the purpose of simplicity of explanation only receptacle 24 is shown to be in use. Receptacle 24 has connected thereto a foot operated manual switch indicated schematically by numeral 30. Finally there is shown a stripping device 35 which is connected to receptacle 36 which is associated with switch 30.

The wire stripping device 35 is shown in an enlarged perspective view in FIG. 2. It includes a generally cylindrically shaped handle 40. Extending from the rear 41 of the handle 40 is a cable 42 for connection with the receptacle 36. Near the front end of the handle 40 there is provided a gripping section 45 which encircles the handle 40. Section 45 in addition to acting as an insulator to the heat developed while the stripper is in use, serves to provide a sure grip by the user. Section 45 may be made of cork or any other similar material. Forward of section 45 is the filament holding head 50 which includes a generally cylindrically shaped metal extension 53 having a plurality of transversely disposed wafer shaped fins 51 which are spaced apart along the longitudinal axis of the extension. The fins 51 are also made of metal and may be made integral with the extension section 53. The fins serve to provide a larger cooling surface for the holding section 50. As may be seen in FIGURE 3 the holding section 50 is separated along its longitudinal axis by a diametrically disposed insulator member 55 to electrically separate the holding section into two longitudinally extending half sections 50a and 50b. The insulator member 55 does not necessarily extend the entire length of the diameter of the section 50 so long as it is of sufficient extent to electrically insulate the two halves one from the other. Two holes 56 and 57 are provided longitudinally through the half sections 50a and 50b. These holes 56 and 57 are substantially parallel with the central axis of the handle 40 and extend a substantial distance into the sections 50a and 50b sufficient to accommodate the insertion of the heater filament 75 as described hereinafter.

Referring now particularly to FIGURES 3 and 6 the heater filament 75 in the presently preferred embodiment is shown. The filament 75 comprises an elongate rod or wire bent intermediate its ends to form an irregular loop as shown in the figures which includes spaced apart longitudinally extending insertion sections 70 and 71 joined at their outer ends by a radially extending closed loop forming the stripper portion 80. That is, the filament 75 is a continuous length of rod or wire which is bent to form spaced apart longitudinally extending legs 70 and 71 as insertion sections. The legs 70 and 71 are formed to be mateable with the longitudinal openings 56 and 57 in the holding head 50. In the embodiment shown the leg sections are bent upon themselves to furnish a double thickness of the wire with a natural resiliency due to the fold to insure a snug mating of the legs with the openings 56 and 57 and firm electrical contact between the legs and the inside surface of the openings. From the foregoing it can be seen that the distance by which the legs are spaced apart is dependent upon the spacing of the openings and the length of the legs is dependent upon the longitudinal extent of the openings. Beyond the legs at a distance sufficient to allow full insertion of the legs into the openings 56 and 57 the stripping loop portion 80 is formed substantially transverse to the legs and thus spaced longitudinally outwardly from the holding head 50 and extending substantially radially outwardly from the longitudinal axis of the device when the filament is positioned in the device as shown in FIGURES 2 through 5. In order to insure retention of the filament within the holding head 50, in this embodiment holes 60a and 60b are formed transversely into the extension section 53 communicating respectively with the filament receiving holes 56 and 57. The holes 60a and 60b are threaded to receive a pair of set screws 61a and 61b, which securely lock the filament into the operative position with the legs 70 and 71 inserted into the head. The sections 70 and 71 of the filament 75 are connected to a pair of wires within cable 42 which wires are not shown but which extend within the handle 40. The stripper portion 80 defines a radially extending inner section forming an inner opening 81 and a radially extending outer section forming an outer opening 82, the openings being coextensive and with the inner opening 81 being larger than the outer opening 82. The outer section contains the apex 83 of the loop together with arm portions 84 and 85 extending divergently therefrom. The inner section contains arm portions 86 and 87 divergently extending from the respective arm portions 84 and 85, and convergent arm portions 88 and 89 extending from the respective arm portions 86 and 87. The loop apex 83 and the arm portions 84–89 are substantially coplanar. The leg portion 71 projects substantially perpendicularly away from the end of the arm portion 88, and the leg portion 70 projects substantially perpendicularly away from the end of the arm portion 89. Thus, the form of the filament 75 is in three sections: an outer section defining the outer opening 82; an inner section defining the coextensive larger opening 81; and the longitudinally extending legs 70 and 71. The filament 75 is rod or wire formed of a material which will retain its configuration and resiliency and semi-rigidity when heated to a relatively high temperature. In addition to possessing high temperature strength when heated to the cutting temperature the material must also be sufficiently malleable to be bent into the required shape as shown in FIG. 6 for example. Further, the heater filament must be of a material which will withstand heating to a temperature in the range from 550° C. to 750° C. Further, the heater filament wire should be capable of being heated to such desired temperature by the passage of a relatively high current therethrough. One material which has been found particularly satisfactory is a nickel chromium alloy sold by the Nichrom Company under the trademark "Nichrome" Alloy V. 22 gauge wire. This wire has a resistance of approximately one ohm per foot. The gauge of the wire, that is, its outside diameter, has been found to be relatively important in order that the wire present a cutting edge to the insulation to be stripped in a manner as will hereinafter be explained. The outside diameter of the 22 gauge wire hereinabove referred to is 0.0253″.

In use the filament 75 is heated by energizing the transformer 11 upon closing of switch 30 of the apparatus shown in FIG. 1. In accordance with the presently preferred embodiment of this invention the transformer will draw approximately 2–3 amps. at each side of the secondary 15 and 16 at approximately 3.75 volts. This will cause the filament 75 to be heated to a temperature between 550° C. and 750° C. In accordance with one example the length of the wire used to produce the filament as shown in perspective in FIG. 6 was 5½″ which resulted in heating to a temperature of approximately 700° C.

It will, of course, be understood to one skilled in the art that the temperature of the filament may be varied by varying any of the parameters including the length of the filament 75, the magnitude of the input voltage thereto or the material from which the filament is made, for example.

In FIGURE 4, the filament 75 is shown in an intermediate stage during the cutting or stripping of the insulation 90 from the conductor 91. In one example Teflon was cut from a wire having a single central conductor. As is well known Teflon has a melting point of approximately 500° C. and the entire cutting operation took place in a matter of seconds. In the exemplary embodiment the time of the filament to be heated to temperature upon closing of the switch 30 was approximately 1 to 2 seconds.

It has been found that the shape of the filament 75 is of particular importance. The radially inner opening 81 being greater than that of the outer opening 82 will permit easy insertion of the end of the wire 91 therewithin. The wire 91 is then forced up into the radially outer opening 82 and upon heating and rotation of the filament 75 relative to the insulation 90 there will be a rapid, efficient and clean cutting of the insulation 90 preparatory to the stripping of the insulation from the conductor.

Thus, it may be seen that the inner opening 81 must be substantially greater in inside dimensions than the outside diameter of the insulation 90 of the wire 91. Conversely, the outer opening 82 has a configuration which is outwardly convergent to a width or diameter which is substantially equal to or less than the diameter of the conductor 92 of the wire such that as the wire is moved outwardly toward the outer extremity of the loop the filament will maintain contact against the insulation over a substantial portion of the periphery until it contacts the conductor 92. Accordingly, it may be seen that the insulation 90 is cut by rotating the heated filament about the wire while maintaining an outward force upon the wire within the opening 82 to cause the filament to burn through the insulation circumferentially about the wire until the conductor is reached. The end of its insulation 90 is removed from the conductor 92 quickly after the cutting operation as shown in FIGURE 4 by simply pulling the wire 91 against the filament 75 in a direction as indicated by arrow 100 in FIGURE 5. Alternatively after the cutting operation as explained in connection with the description of FIGURE 4 the end of the insulation about the conductor 91 may simply be removed by manually pulling it over the end of the conductor 92.

Thus, there has been described a new and improved electrical wire insulation stripping device which will efficiently remove the insulation from the end of the wire without causing any damage to the underlying conductor which conductor may include a single wire or a plurality of strands. The many modifications will be apparent within the spirit of the invention, for example, the diameter of the filament 75 may be varied to produce a finer or a less fine cutting edge of the insulation. Further the cross section of the wire of the filament 75 need not be circular but can be of any shape which is desirable. The shape of section 80 may be varied to present any desired configuration depending upon the outside diameter and type of insulation to be removed from a particular wire.

What is claimed as new is:

1. An electric wire stripper for removing the insulation surrounding an electrical conductor comprising: a longitudinally extending handle section; a holding head at one end of said head section, said holding head being formed of electrically conductive material; means positioned within said holding head for separating said head into first and second longitudinally extending sections; an elongate filament bent intermediate its ends to form an irregular loop defining first, second and third sections, said first section containing the apex of said loop with first and second arm portions divergently extending therefrom, said second section defining a third arm portion extending from said first arm portion and a fourth arm portion extending from said third arm portion together with a fifth arm portion extending from said second arm portion and a sixth arm portion extending from said fifth arm portion, said third and fifth arm portions extending divergently away from said first and second arm portions, said fourth and sixth arm portions extending convergently from said third and fifth arm portions, the arm portions of said first and second sections being substantially coplanar, said third section containing the ends of said elongate filament, the ends of said elongate filament being in straight parallel spaced alignment and extending substantially perpendicularly from said fifth and sixth arm portions, the ends of said elongate filament being connected between said first and second holding head sections and extending longitudinally therefrom; and electrical circuit means for conducting electricity through said filament and said first and second head sections.

2. An electric wire stripper for removing the insulation surrounding an electrical conductor comprising: a longitudinally extending handle section; a holding head at one end of said head section, said holding head being formed of electrically conductive material; means positioned within said holding head for separating said head into first and second longitudinally extending sections; an elongate filament bent intermediate its ends to form an irregular loop defining first, second and third sections, said first section containing the apex of said loop with first and second arm portions divergently extending therefrom, said second section defining a third arm portion extending from said first arm portion and a fourth arm portion extending from said third arm portion together with a fifth arm portion extending from said second arm portion and a sixth arm portion extending from said fifth arm portion, said third and fifth arm portions extending divergently away from said first and second arm portions, said fourth and sixth arm portions extending convergently from said third and fifth arm portions, the arm portions of said first and second sections being substantially coplanar, said third section containing the ends of said elongate filament, the ends of said elongate filament being in straight parallel spaced alignment and extending substantially perpendicularly from said fifth and sixth arm portions, the ends of said elongate filament being connected between said first and second holding head sections and extending longitudinally therefrom; a transformer including a primary winding and a plurality of secondary windings, said primary winding being adapted to be connected to a source of A.C. potential; and a switch connected between one of said secondary windings and said first and second head sections for conducting electricity through said filament and said first and second head sections.

3. In an electrical wire stripper for removing the insulation surrounding an electrical conductor, a wire type heating element bent intermediate its ends to form an irregular loop defining first and second and third sections, said first section containing the apex of said loop with first and second arm portions divergently extending therefrom, said second section defining a third arm portion extending from said first arm portion and a fourth arm portion extending from said third arm portion together with a fifth arm portion extending from said second arm portion and a sixth arm portion extending from said fifth arm portion, said third and fifth arm portions extending divergently away from said first and second arm portions, said fourth and sixth arm portions extending convergently from said third and fifth arm portions, the arm portions of said first and second sections being substantially coplanar, said third section containing the ends of said wire element, the ends of said wire element being in straight parallel alignment and extending substantially perpendicularly from said fifth and sixth arm portions, the ends of said wire element being disposed parallel to the longitudinal axis of said wire stripper and adapted for connection to a source of electrical current.

4. In an electrical wire stripper for removing the insulation surrounding an electrical conductor, a wire type heating element bent intermediate its ends to form an irregular loop defining first and second and third sections, said first section containing the apex of said loop with first and second arm portions divergently extending therefrom, the wire diameter of said apex being slightly greater than the outer diameter of insulation on the wire to be stripped, said second section defining a third arm portion extending from said first arm portion and a fourth arm portion extending from said third arm portion together with a fifth arm portion extending from said second arm portion and a sixth arm portion extending from said fifth arm portion, said third and fifth arm portions extending divergently away from said first and second arm portions, said fourth and sixth arm portions extending convergently from said third and fifth arm portions, the arm portions of said first and second sections being substantially coplanar, said third section containing the ends of said wire element, the ends of said wire element being in straight parallel alignment and extending substantially perpendicularly from said fifth and sixth arm portions, the ends of said wire element being disposed parallel to the longitudinal axis of said wire stripper and adapted for connection to a source of electrical current.

5. In an electrical wire stripper for removing the insulation surrounding an electrical conductor, a wire type heating element bent intermediate its ends to form an irregular loop defining first and second and third sections, said first section containing the apex of said loop with first and second arm portions divergently extending therefrom, the wire diameter of said apex being slightly greater than the outer diameter of insulation on the wire to be stripped, said second section defining a third arm portion extending from said first arm portion and a fourth arm portion extending from said third arm portion together with a fifth arm portion extending from said second arm portion and a sixth arm portion extending from said fifth arm portion, said third and fifth arm portions extending divergently away from said first and second arm portions, said fourth and sixth arm portions extending convergently from said third and fifth arm portions, the arm portions of said first and second sections being substantially coplanar, said third section containing the ends of said wire element, the ends of said wire element being in straight parallel alignment and extending substantially perpendicularly from said fifth and sixth arm portions, the ends of said wire element being disposed parallel to the longitudinal axis of said wire stripper and adapted for connection to a source of electrical current, said filament being formed of a material which will retain its resiliency when heated to a temperature within the range of about 550° C. to 750° C. and which has an outside diameter which is small with respect to the outside diameter of the insulation to be removed.

References Cited in the file of this patent

UNITED STATES PATENTS

| | | |
|---|---|---|
| 1,930,214 | Wappler | Oct. 10, 1933 |
| 2,012,938 | Beuoy | Sept. 3, 1935 |
| 2,101,913 | Meyer | Dec. 14, 1937 |
| 2,734,986 | Gameros | Feb. 14, 1956 |

FOREIGN PATENTS

| | | |
|---|---|---|
| 272,606 | Italy | Mar. 14, 1930 |
| 138,079 | Australia | July 25, 1950 |
| 1,032,353 | Germany | June 19, 1958 |